United States Patent [19]

Hartmann, Jr. et al.

[11] Patent Number: 4,964,325
[45] Date of Patent: Oct. 23, 1990

[54] CUT-OFF MACHINE

[75] Inventors: Richard Hartmann, Jr., Brighton; John H. Nolan, Mt. Clemens, both of Mich.

[73] Assignee: Alpha Industries, Inc., Novi, Mich.

[21] Appl. No.: 499,623

[22] Filed: Mar. 26, 1990

Related U.S. Application Data

[63] Continuation-in-part of Ser. No. 290,301, Dec. 27, 1988, abandoned.

[51] Int. Cl.$^5$ ............................................. B62D 1/60
[52] U.S. Cl. ...................................... 83/321; 83/327; 83/318; 83/642
[58] Field of Search .................. 83/54, 308, 310, 318, 83/319, 320, 321, 327, 642, 500, 503, 495; 74/665 L, 665 B, 665 GF

[56] References Cited

U.S. PATENT DOCUMENTS

| | | | |
|---|---|---|---|
| 1,914,136 | 6/1933 | Larsen | 74/665 L |
| 2,439,077 | 4/1948 | Conner | 83/321 |
| 3,132,739 | 5/1964 | Jakobsson et al. | 74/665 GE |
| 3,288,011 | 11/1966 | Borzym | 83/310 |
| 3,288,012 | 11/1966 | Borzym | 83/310 |
| 3,611,781 | 6/1969 | Pieper | 72/339 |
| 3,719,091 | 3/1973 | Drummer et al. | 74/44 |
| 3,735,673 | 5/1973 | Shoehan et al. | 83/319 |
| 4,274,316 | 6/1981 | Roy et al. | 83/23 |
| 4,311,472 | 1/1982 | Hiersig et al. | 74/665 L |
| 4,376,401 | 3/1983 | Borzym | 83/319 |
| 4,404,868 | 9/1983 | Kleine | 74/665 GE |
| 4,443,171 | 4/1984 | Dixon | 425/78 |
| 4,637,287 | 1/1987 | Kusakabe | 83/319 |
| 4,723,882 | 2/1988 | Wissman et al. | 413/66 |

Primary Examiner—Frank T. Yost
Assistant Examiner—Scott A. Smith
Attorney, Agent, or Firm—Krass & Young

[57] ABSTRACT

A cut-off machine especially suitable for handling tubing and including a machine frame defining a work treatment area, a ram on the frame adjacent the work treatment area mounted for movement through a power stroke by at least two drive members engaging the ram at spaced points, a motor system mounted on the frame, and a drive system interconnecting the motor system and the drive members on the ram. The drive system comprises a pair of flywheels driven by the motor system, a pair of crank shafts driven by the flywheels through a clutch associated with each flywheel, and a crank portion on each crank shaft journalled in the ram so that the ram is moved through an orbital path in response to rotation of the crank shafts. A gear train is positioned between the crank shafts to synchronize the rotation of the crank shafts to ensure that the ram moves in a translatory manner through its orbital path.

22 Claims, 7 Drawing Sheets

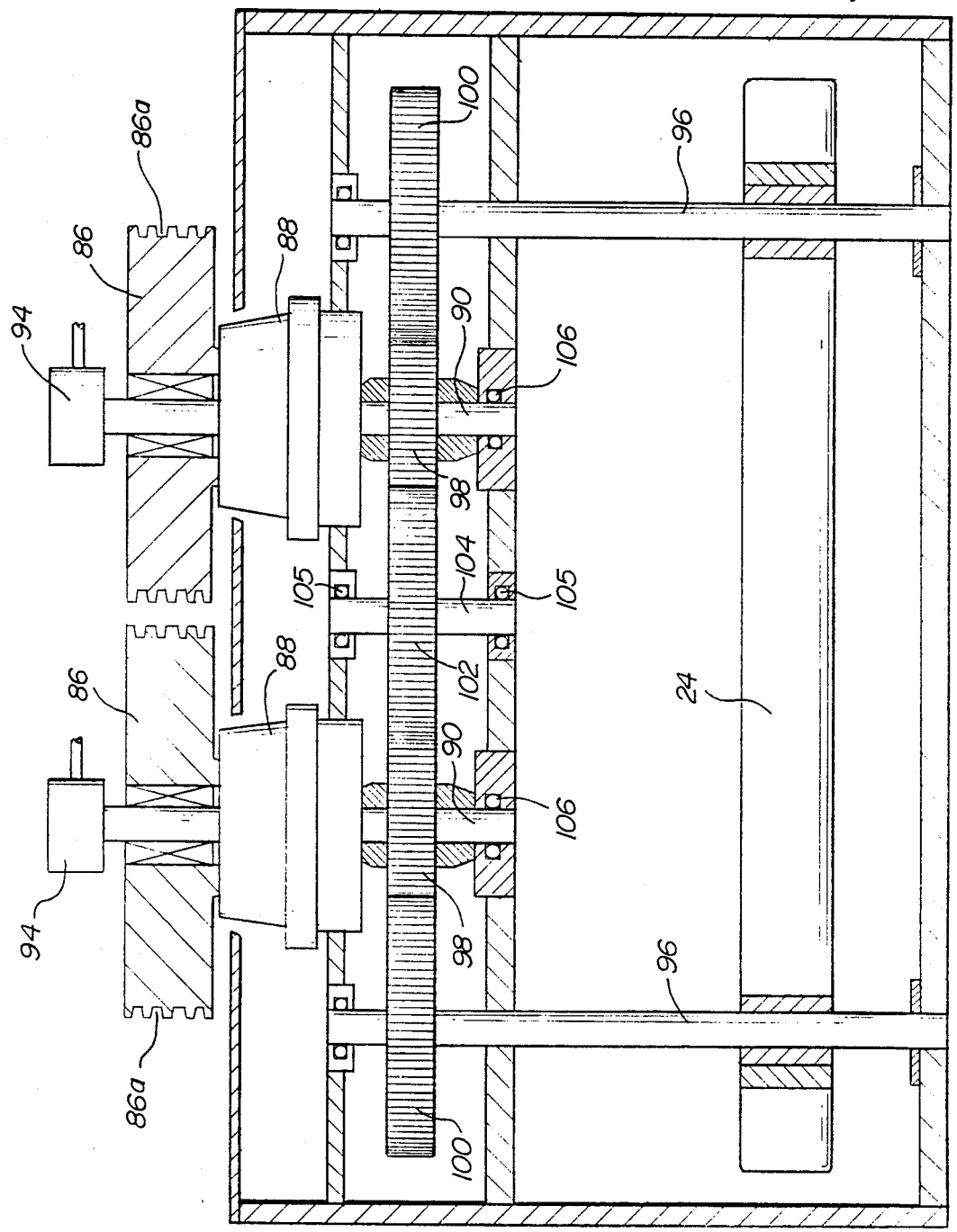

CUT-OFF MACHINE

This application is a continuation-in-part of U.S. application Ser. No. 290,301, now abandoned.

BACKGROUND OF THE INVENTION

This invention relates to a cut-off machine of the type especially suitable for use in association with fabrication mills producing a continuously emanating elongated workpiece of constant cross section, such as welded tubing. More particularly, the invention concerns cut-off machines of the type in which a cut-off die set is caused to be operated during traversing movement with the workpiece as it emanates from the tubing mill.

A variety of cut-off machines have been used in the past to rapidly and successively sever materials emanating from a mill at a constant rate. Examples of such cut-off machines are shown in U.S. Pat. Nos. 3,288,012, 3,288,011, 4,228,706 and 4,354,409.

Cut-off machines of the above-mentioned type include a ram supported on the machine frame, for movement through a power stroke. Power is supplied to the ram from a continuously running power source such as an electric motor. The electric motor supplies power to a single flywheel which transfers the power to a power shaft through a clutch and brake assembly. The power shaft may be connected to and supply power directly to the ram or may be connected by a gear train to a second power shaft engaging and driving the ram. As the clutch and brake assembly is selectively actuated the ram is caused to travel through the power stroke causing the cut-off die set to sever a section of the workpiece.

Cut-off machines of this type have proven to be generally satisfactory. However, there are situations, especially where the tubing to be cut is of a relatively large size, where the stresses developed in the drive train of the machine, particularly in the clutch and in the gear teeth, become excessive resulting in excessive maintenance requirements. Excessive maintenance creates down-time not only for the cut-off machine, but for the fabrication mill as well. Increased down time results in lost production and correspondingly lost revenue to the tubemaker. The excessive stresses encountered in the cutting of large sized tubing can be dealt with by substantially increasing the size and strength of the individual components of the drive train but this approach results in an expensive, heavy and cumbersome machine.

SUMMARY OF THE INVENTION

This invention is directed to the provision of an improved cut-off machine especially suitable for use in severing tubing emanating from a tube mill.

More specifically, this invention is directed to a cut-off machine which is especially suitable for handling tubing or other elongated workpieces of relatively large size without necessitating a commensurate increase in the size and complexity of the cut-off machine.

The invention cut-off machine is of the type including a machine frame defining a work treatment area, a ram on the frame adjacent the work treatment area mounted for movement through a power stroke by at least two drive members engaging the ram at spaced points, motor means mounted on the frame, and drive means interconnecting the motor means and the drive members on the ram.

According to the invention, the drive means interconnecting the motor means and the drive members on the ram comprises, means directing power from the motor means to the drive members along two separate power trains and means, separate from the power trains and said power directing means, interconnecting the power trains and operative to synchronize the power delivered to the ram through the separate power trains so as to synchronize the movement of the ram through its power stroke.

In the first embodiment of the invention, each power train includes a flywheel connected to a power shaft by a clutch assembly. The power shaft is connected to a drive member engaging the ram. To synchronize the rotation of the power shafts a gear train, including gears mounted to each of the power shafts and at least one idler gear, extends between and interconnects the individual power shafts. The gears serve only a synchronizing function and therefore may be relatively lightweight which reduces the stress on the gear teeth.

According to a second embodiment, each power train includes a flywheel connected to a power shaft by a clutch assembly. A drive gear mounted to the power shaft engages and drives a driven gear mounted to a corresponding drive member. The use of at least two power trains minimizes and reduces the stresses developed in the respective clutches and drive gears. The individual power trains are synchronized by an idler gear, mounted on an idler shaft journalled in the machine frame. The idler gear engages the individual drive gears of the respective power trains and synchronizes the rotation of said power shafts.

A third embodiment includes a separate motor means driving each individual flywheel.

The use of at least two separate individual power trains results in two separate flywheels driving two separate power shafts through two separate clutch assemblies and facilitates the smooth and effective delivery of power to the ram through two separate paths minimizing the stresses developed in the individual power train components. Splitting the power being delivered to the ram from the motor means through at least two separate power trains allows the invention cut-off machine to effectively sever large tubing without requiring a corresponding increase in the size and strength of the components of the power train. Further, the above inventive concepts disclosed herein can be used with any of the previously mentioned cutoff machines; i.e., those machines utilizing an orbiting ram, a swinging ram or a combination swinging and orbiting

BRIEF DESCRIPTION OF THE DRAWINGS

FIGS. 6 and 7 are fragmentary cross-sectional views taken on lines 6—6 and 7—7 of FIG. 6.

DETAILED DESCRIPTION OF THE PREFERRED EMBODIMENT

Figure 1:
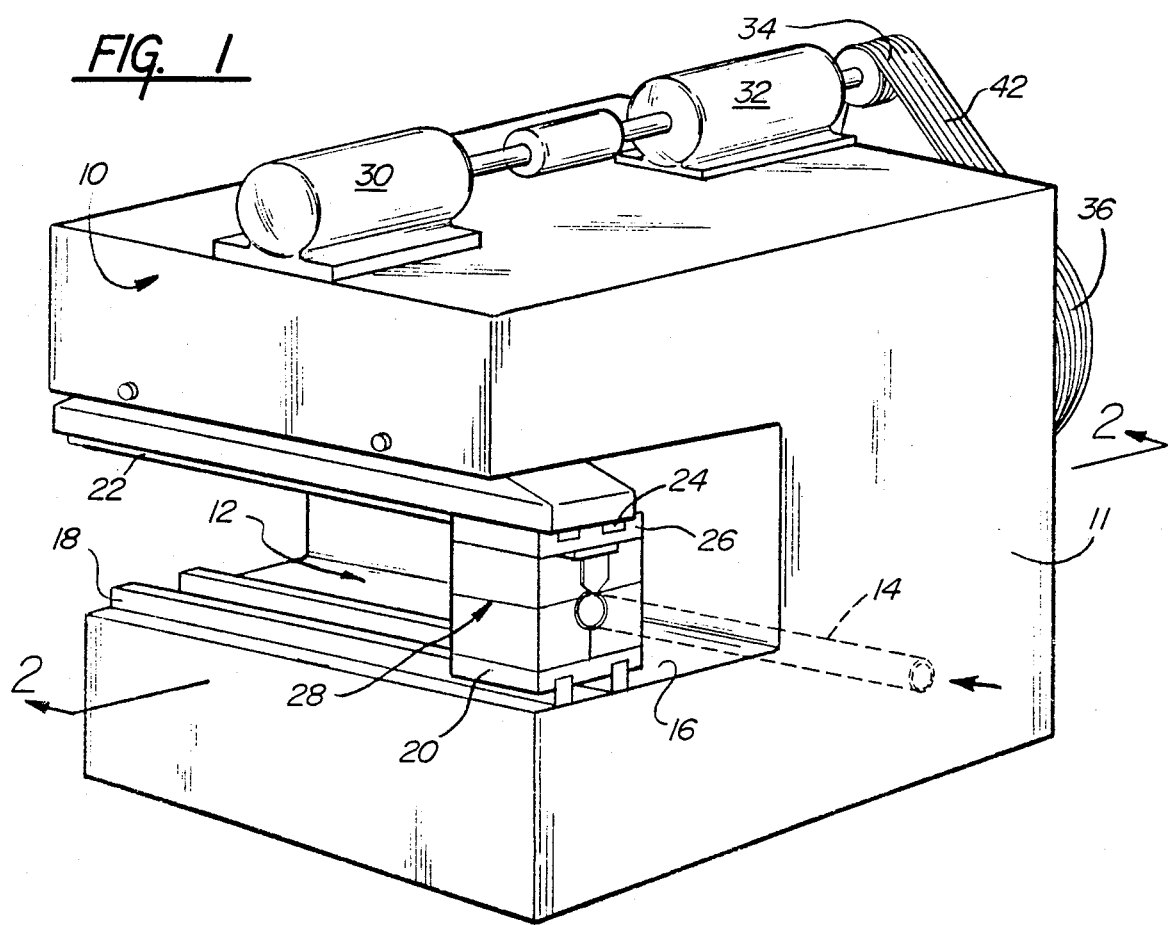
FIG. 1 is a perspective view of a cut-off machine according to the invention.

The cut-off machine 10 of the first embodiment seen in FIG. 1 includes a frame structure 11 having a generally C-shaped configuration so as to define a work station 12 for performing a work operation such as severing tubing 14 emanating from a tubing mill. Work station 12 includes a horizontal surface 16 mounting a set of lower axially extending rails 18 slidably mounting a lower die set carriage 20. Cut-off machine 10 further includes a ram 22 including a set of upper axially extending rails 24 slidably mounting an upper die set carriage 26. Each of the upper and lower die set carriages 20 and 26 are axially slidable on their respective rail sets 18 and 24 along the axial length of the machine, as described in U.S. Pat. Nos. 3,288,011 and 3,288,012, so that a die set 28 mounted therein may be carried along by the tubing when clamped thereto during the severing of the workpiece. Further details of a die set 28 suitable for use with the upper and lower die set carriages 20 and 26 are shown in the aforementioned U.S. Pat. Nos. 3,288,011 and 3,288,012.

Broadly speaking, die set 28 is moved axially with carriages 20 and 26 along the upper and lower rails in clamping relation to the tubing 14 and a guillotine blade carried by the die set severs the tubing as the die set moves with the tubing. The operation of the clamping members of the die set as we)1 as the operation of the guillotine of the die set are controlled by the ram 22 the ram 22 when urged through the downward portion of the power stroke causes the upper carriage 26 to move downwardly with respect to the lower carriage 20 actuating suitable cam devices which bring the clamping members of the die set into clamping engagement with the tubing. Continued downward movement of the upper carriage 26 causes the guillotine blade to sever a length of tubing, whereafter the ram is moved upwardly to withdraw the guillotine blade and release the tubing so that the die set 28 may by returned, to its initial position on the rails 18 in preparation for a new cutting stroke.

The ram of the cut-off machine is supported on the frame and may be urged through a power stroke having various motions, including an orbital motion, see U.S. Pat. No. 3,288,012, a swinging motion, see U.S. Pat. Nos. 3,288,011, and 4,228,706 or a combination swinging and orbital motion, see U.S. Pat. No. 4,354,409. The invention disclosed herein may be utilized to transfer the power from a motor means to the ram in any one of the above-mentioned cut-off machines. While the embodiments disclosed herein refer to a cut-off machine utilizing an orbital ram, this is for illustration purposes only and the invention can be used to transfer the power necessary to urge the ram of a swinging ram or combination swinging and orbital ram cutoff machine through its power stroke.

Figure 2:
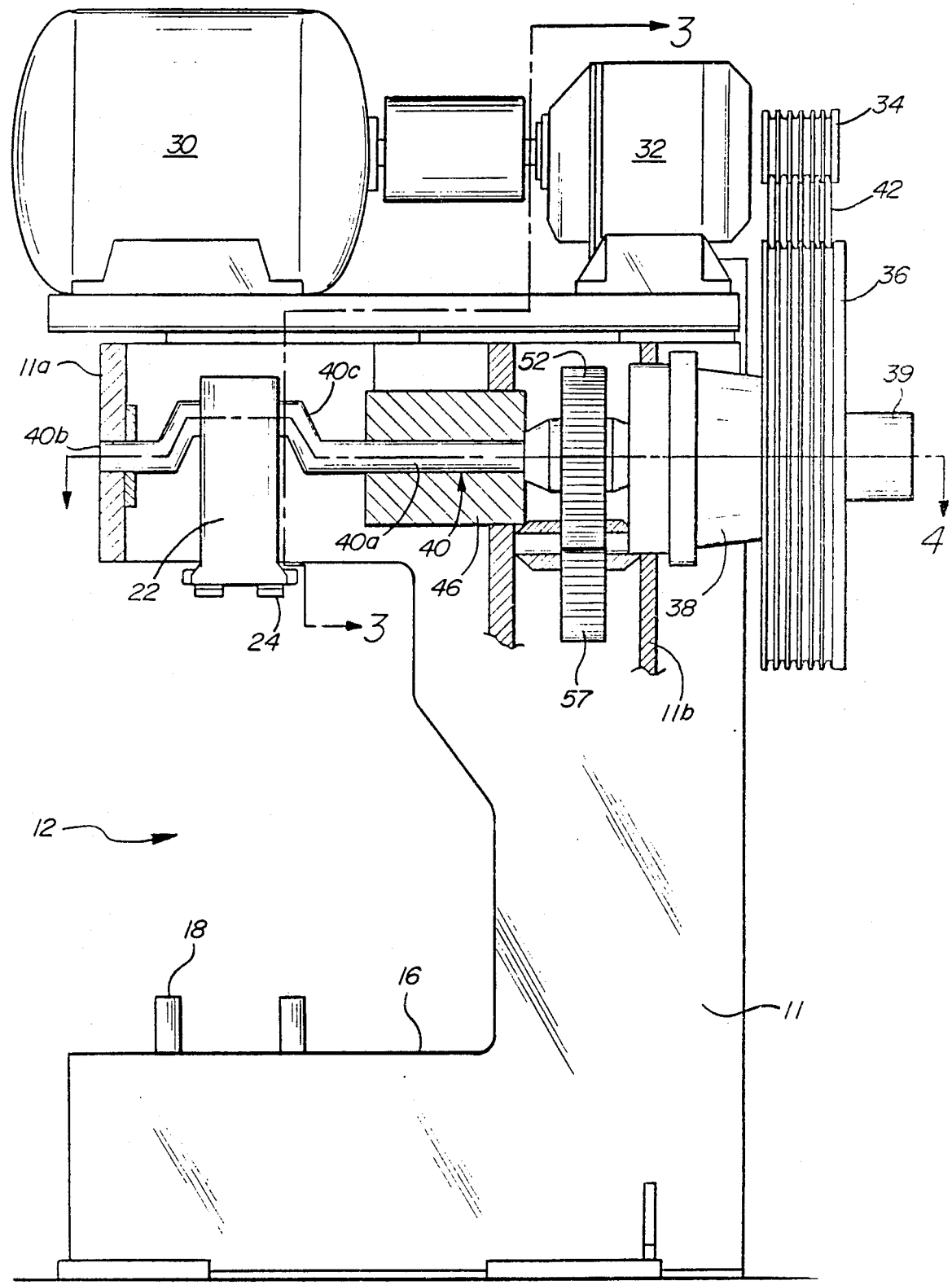
FIG. 2 is a fragmentary cross-sectional view taken on line 2—2 of FIG. 1.
Figure 3:
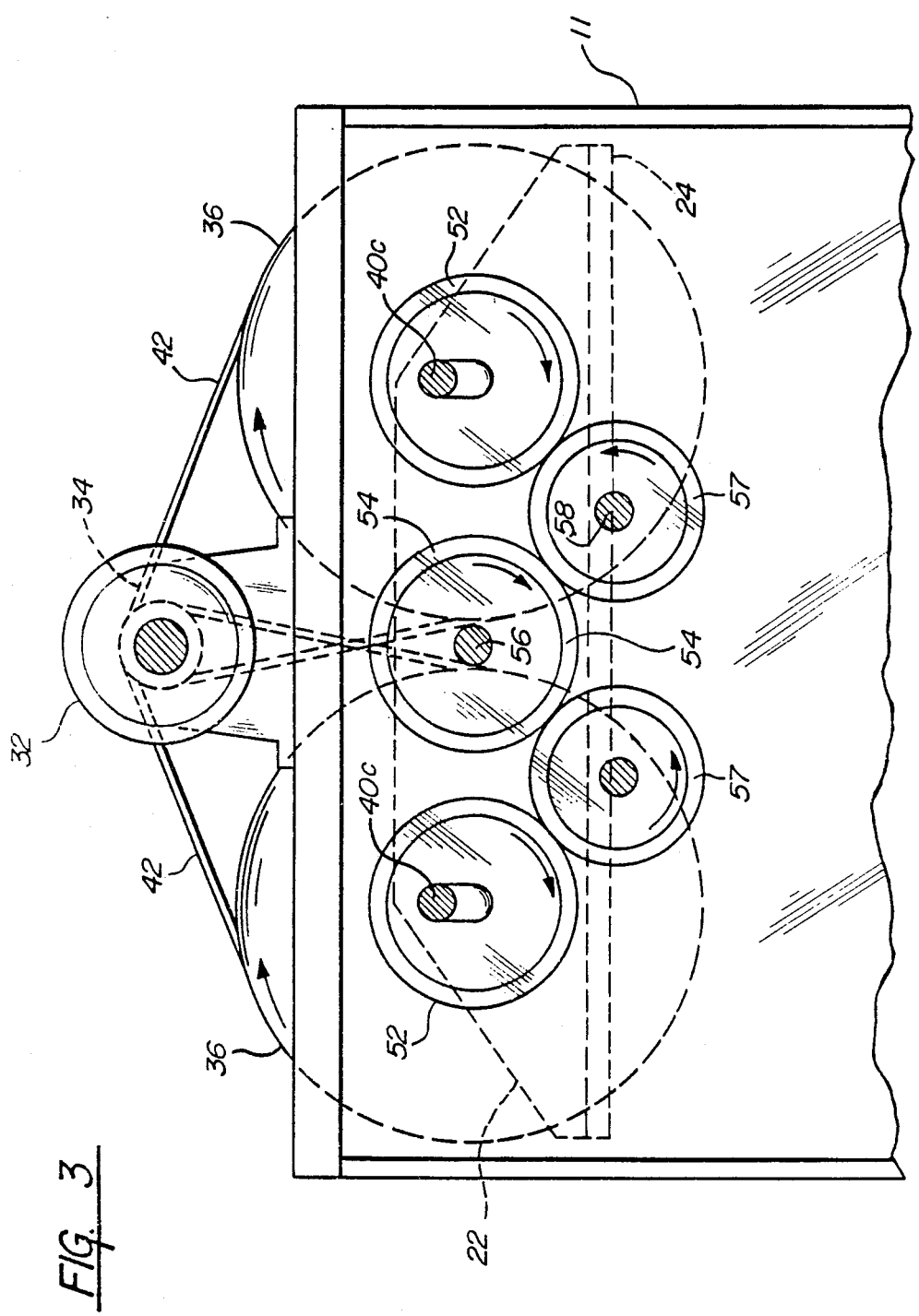
FIGS. 3 and 4 are fragmentary cross-sectional views taken on lines 3—3 and 4—4, respectively, of FIG. 2.
Figure 4:
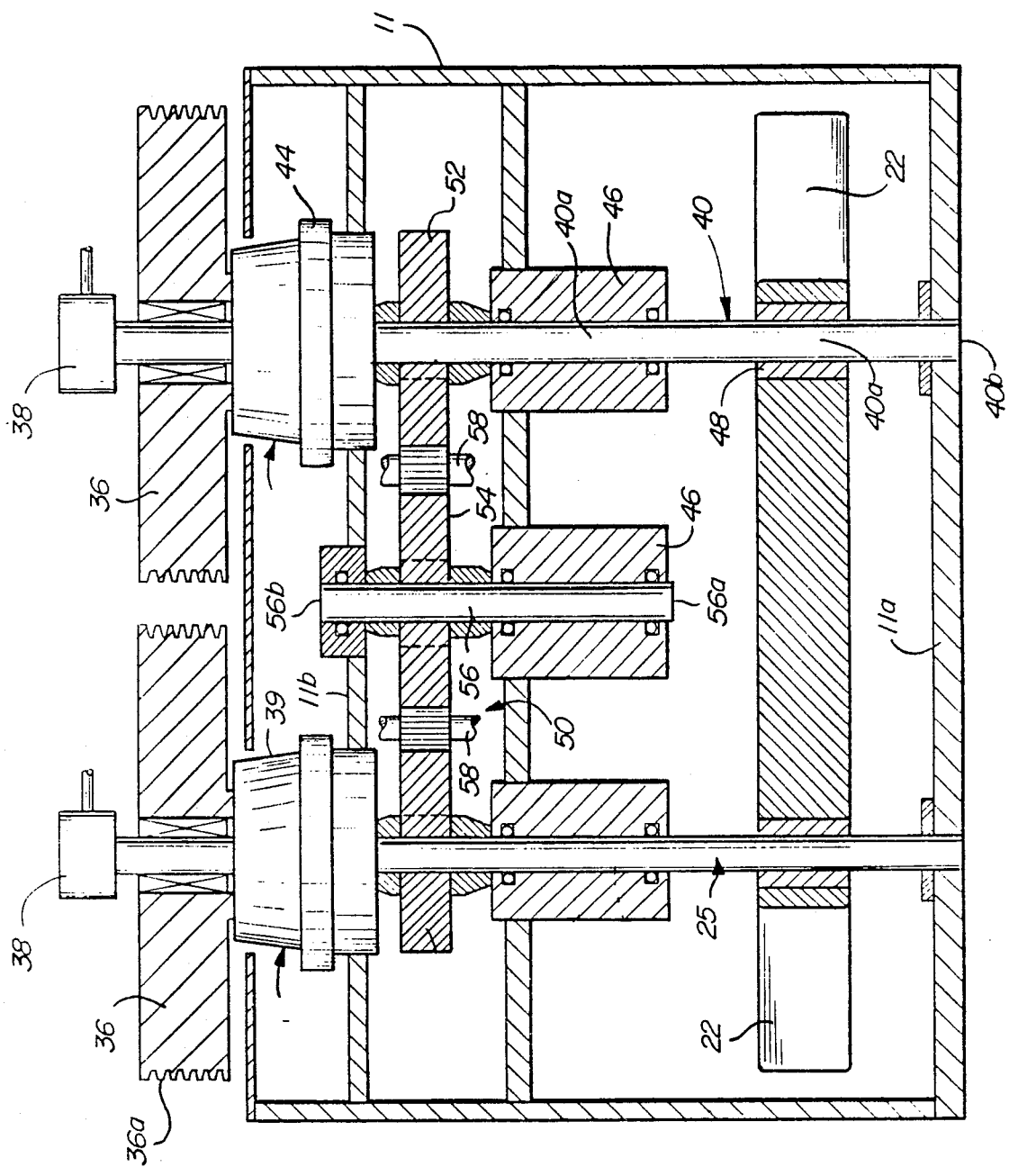

Referring to FIGS. 2-4, an orbital ram cut-off machine of a type incorporating the first embodiment of the present invention is depicted. The drive means for moving the ram selectively through its orbital stroke includes an electric motor 30, a speed reduction unit 32, a pulley 34, spaced flywheels 36, a clutch and brake assembly 38 associated with each flywheel, and a crankshaft 40 associated with each flywheel and clutch.

Electric motor 30, speed reducer 32, and pulley 34 are serially aligned on top of the frame 11, extending from front to rear of the frame, so as to dispose the pulley 34 in rearwardly spaced relation to the rear face of the frame. Flywheels 36 are mounted at the rear face of the frame in axially spaced relation and symmetrically disposed relative to pulley 34, and each define a plurality of grooves 36a for driving receipt of a plurality of belts 42 trained around pulley 34 so that the flywheels 36 are simultaneously driven in response to rotation of pulley 34.

Clutch and brake assemblies 38 may be of the hydraulic or pneumatic type and each includes an actuator 39. Clutch and brake assemblies 38 serve in known manner to selectively interconnect a respective flywheel 36 with a respective Crankshaft 40 or to brake a respective crankshaft.

Each crankshaft 40 includes a main body portion 40a extending forwardly from the respective clutch 38 and passing through and rotationally supported by bearing structures 46 suitably supported by bulk-heads of the machine frame 11; a forward portion 40b suitably journalled in the front bulkhead 11a of the frame; and a crank portion 40c constituting a throw of the crankshaft and journalled by a suitable bearing 48 to the ram 22.

In a typical duty cycle wherein the cut-off machine is operating in conjunction with tubing emanating continuously from a tubing mill, electric motor 30 runs continuously so that flywheels 36 are driven continuously via pulley 34 and belts 42. Clutches 38 are selectively and simultaneously actuated to drivingly interconnect the flywheels 36 and the crankshafts 40 so as to move the ram 22 through an orbital path with the precise shape and dimension of the orbital path determined by the axial spacing between the crankshafts 40 and by the magnitude of the throw defined by each crank portion 40c.

The invention cut-off machine further includes synchronizing means to ensure that the crankshafts 40 remain in synchronization with each other so that the ram is moved in a smooth, translatory manner through its orbital path. The synchronizing means comprises a gear train 50 including a spur gear 52 drivingly secured to each crankshaft 40; a spur idler gear 54 mounted on a lay shaft 56 journalled at its forward end 56a in a bearing structure 46 and journalled at its rearward end 56b in frame bulkhead 11b; and a set of further idler spur gears 57 meshingly interengaging a respective spur gear 52 and idler 54 and carried on lay shafts 58 suitably journalled in machine frame 11.

It will be seen that synchronizing gear train 50 operates to ensure that the axially spaced crankshafts 40 rotate at equal speeds at all times irrespective of slippage in the belts 42 or in the clutches 38 so as to ensure that the crank portions 40c of the crankshafts rotate in precise phase and thereby ensure that the ram moves in a translatory manner throughout its orbital path.

Figure 5:
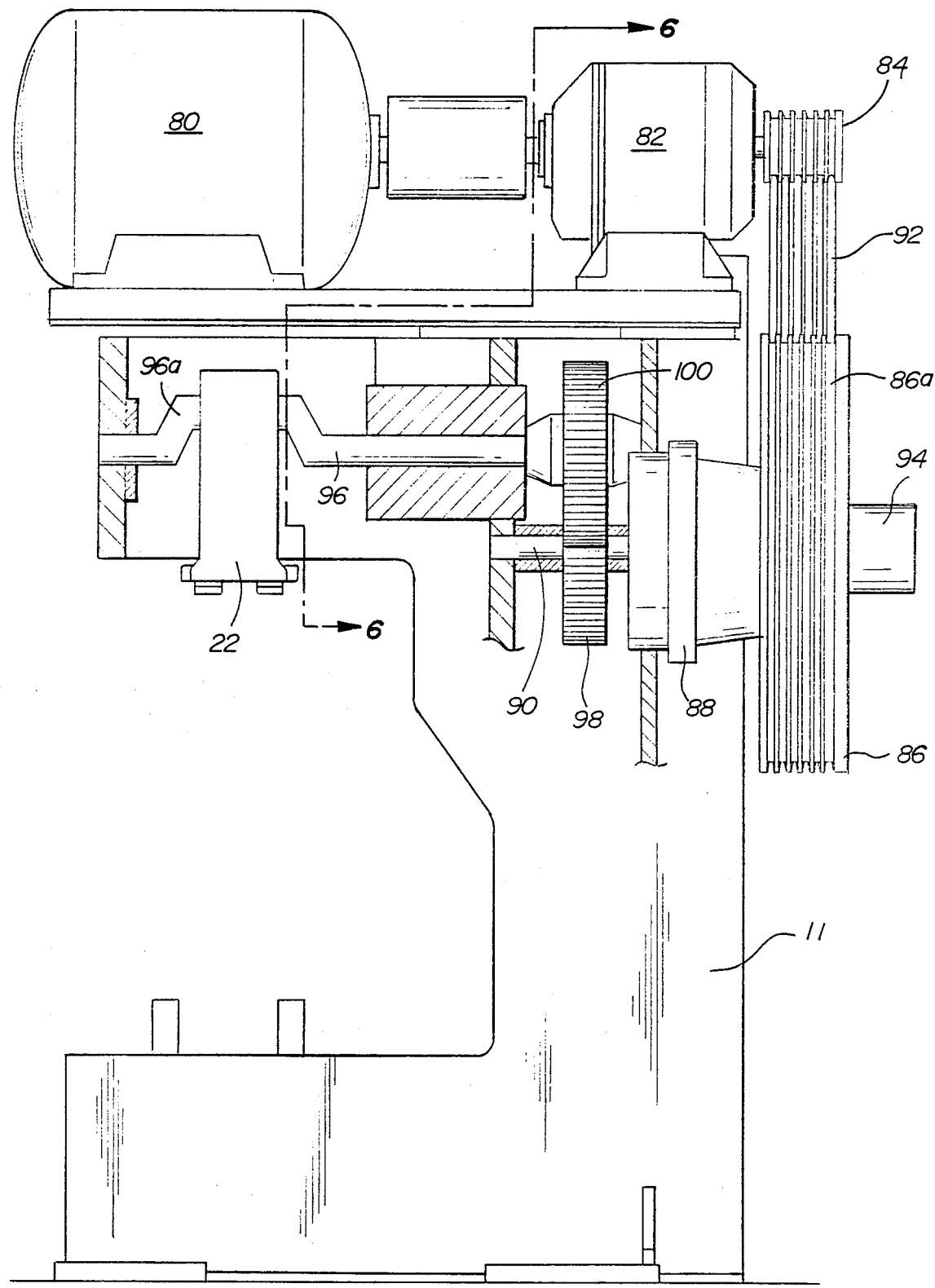
FIG. 5 is a fragmentary cross-sectional view taken on line 2—2 of FIG. 1 showing a second embodiment of the invention.
Figure 6:
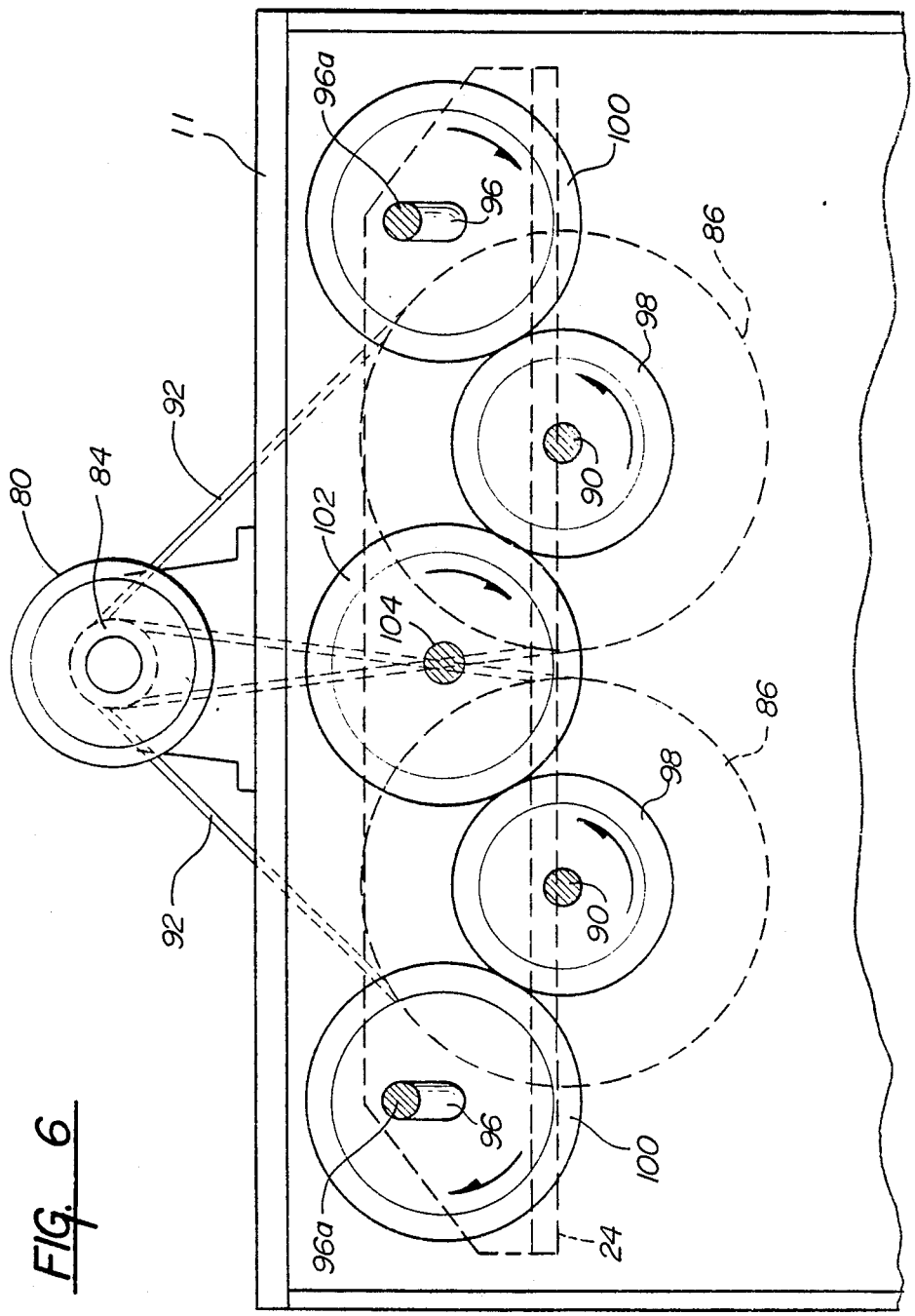

Referring to FIGS. 5-7, an orbital ram cut-off machine of the type incorporating the second embodiment of the present invention is depicted. The drive means for moving the ram selectively through an orbital stroke includes an electric motor 80, a speed reduction unit 82, a pulley 84, spaced flywheels 86, a clutch and brake assembly 88, a power shaft 90 associated with each flywheel, a drive gear 98 mounted to the power shaft 90, and a crank shaft 96 having a driven gear 100 engaging the drive gear 98.

Electric motor 80, the speed reducer 82 and the pulley 84 are serially aligned on top of the frame 11, extending from front to rear of the frame, so as to dispose the pulley 84 in rearwardly spaced relation to the rear face of the frame. Flywheels 86 are mounted to rear face of the frame in axially spaced relation and symmetrically juxtaposed relative to pulley 84, and each define a plurality of grooves 86a for driving receipt of a plurality of belts 92 turning around pulley 84 so that the flywheels 86 are simultaneously driven in response to rotation of pulley 84.

Clutch and brake assemblies 88 may be of the hydraulic or pneumatic type and each includes an actuator 94. Clutch and brake assemblies 88 serve in known manner to selectively interconnect a respective flywheel 86 with a respective power shaft 90 or to brake a respective power shaft.

Each power shaft 90 includes a main body portion extending forwardly from the respective clutch and brake assembly 88 and is rotationally supported by a bearing structure 106 suitably mounted in the bulkhead of the machine frame 11. The drive gear 98 is mounted to the power shaft 90 and engages a driven gear 100 mounted to the crank shaft 96. The crank shaft 96 is journalled within the machine frame 11 and includes a crank portion 96a.

In a typical duty cycle wherein the cut-off machine is operating in conjunction with tubing emanating continuously from the tubing mill, electric motor 80 runs continuously so that flywheels 86 are driven continuously via pulley 84 and belts 92. Clutch and brake assemblies 88 are selectively and simultaneously actuated to drivingly interconnect the flywheels 86 and the power shafts 90 causing rotation of the power shaft 90. Rotation of the power shaft 90 and corresponding drive gear 98 transfers the power to the driven gear 100 causing rotation of the crank shaft 96 so as to move the ram 22 through an orbital path with the precise shape and dimensions of the orbital path determined by the axial spacing between the crank shaft 96 and the magnitude of the crank portion 96a.

The invention cut-off machine further includes an idler gear 102 mounted on an idler shaft 104 journalled in the machine frame 11 by a pair of bearings 105. The rotation of the power shafts 90 are synchronized by the idler gear 102 so that the ram is moved in a smooth, translatory manner through its orbital path. The idler gear 102 engages the individual drive gears 98 and operates to ensure that the axially spaced power shafts 90 rotate at equal speed at all times irrespective of slippage in the belts 92 or clutch and brake assemblies 88.

Figure 8:
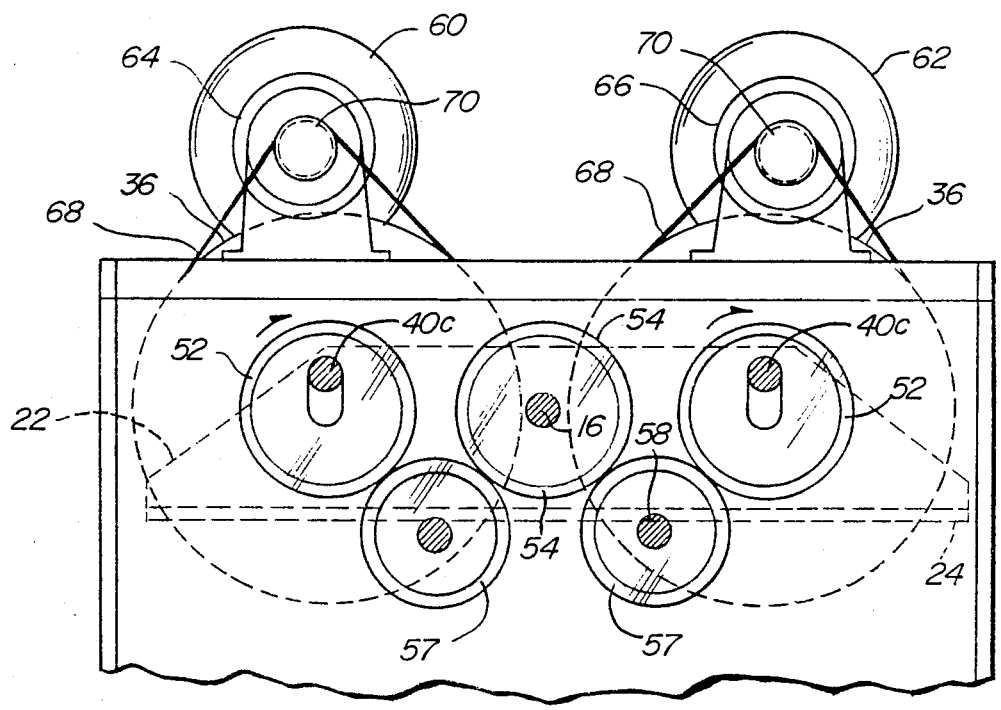
FIG. 8 is a view similar to FIG. 3 but showing a third embodiment of the invention.

A third embodiment of the invention seen in FIG. 8 is identical to the first embodiment seen in FIGS. 1-4 with the exception that the single electric motor 30 and the single gear reducer 32 are replaced by a pair of electric motors 60 and 62 respectively driving gear reducers 64 and 66 with a separate belt 68 associated with the pulley 70 of each of the gear reduction units and respectively driving the individual flywheels 36 so that the crankshafts are individually driven by separate electric motors. The cut-off apparatus of FIG. 8 is otherwise identical to the cut-off apparatus of FIG. 1-4. The individual motors 60 and 62 need not be synchronized with respect to each other since the synchronizing gears operate to ensure that the axially spaced crank shafts 40 rotate at equal speeds at all times irrespective of asychronism as between the individual motors. While the third embodiment of the invention is shown in connection with the first embodiment, individual motors 60,62 driving individual flywheels 36 may also be used to supply power to the flywheels 86 of the second embodiment.

The cut-off machine of the invention will be seen to have many important advantages. Specifically, since the power to the ram is split and moves through two distinct drive trains, the stress in each drive train is substantially reduced as compared to prior art machines in which the power is delivered to the ram through a single drive train. In particular, the stresses on the clutches are substantially reduced as compared to prior art single drive train designs so as to allow a given clutch to operate at a significantly lower stress level and thereby substantially prolong the efficient operational life of the clutch. Further, since the gears constituting the synchronizing gear trains do not experience any appreciable load but rather serve only a synchronizing function, the stresses in the teeth of the gears are substantially reduced as compared to prior art machines in which the drive train load passes through a gear train and, specifically, passes through and highly stresses the individual teeth of the interengaged gears. Further since the synchronizing gears do not carry any appreciable loading, they may be relatively small and relatively lightweight with a commensurate reduction in the inertia of the moving parts of the drive train, whereby to facilitate starting and stopping of the cut off machine and further reduce stresses in the drive train. Since the invention cut-off machine substantially reduces the stresses in the clutches and in the teeth of the gears of the machine, two of the most common maintenance and failure points of prior art machines, the invention cut-off machine is substantially more durable than prior art machines and requires substantially less maintenance. Critically, the invention cut-off machine requires less down-time and thereby allows the associated tube mill to run on a substantially continuous basis with little or no need to shut down the mill because of failures in the drive mechanism of the cut-off machine.

Whereas a preferred embodiment of the invention has been illustrated and described in detail, it will be apparent that various changes may be made in the disclosed embodiment without departing from the scope or spirit of the invention.

We claim:

1. In a cut-off machine of the type including a machine frame defining a work treatment area, a ram on the frame adjacent the work treatment area mounted for movement through a power stroke by at least two drive members engaging the ram at spaced points thereon, motor means mounted on the frame, and drive means interconnecting said motor means and said drive members, the improvement wherein said drive means comprises:
   (A) means directing power from said motor means to said drive members along two separate power trains; and
   (B) means, separate from said power trains and said power directing means, drivingly interconnecting said power trains and operative to synchronize the power delivered to said ram through said separate power trains and thereby synchronize the movement of said ram through its power stroke.
2. A cut-off machine according to claim 1 wherein:
   (C) each power train includes a power shaft driven by said motor means and connected to a respective drive member; and
   (D) said synchronizing means extends between and synchronizes the rotation of said power shafts.
3. A cut-off machine according to claim 2 wherein:

(E) said synchronizing means comprises a gear train including gears respectively mounted on said power shafts and at least one idler gear.

4. A cut-off machine according to claim 3 wherein:
(F) each power train further includes a flywheel driven by said motor means and a clutch interconnecting the respective flywheel and the respective power shaft.

5. A cut-off machine according to claim 4 wherein:
(G) said motor means comprises a single motor means driving both of said flywheels.

6. A cut-off machine according to claim 5 wherein:
(H) said single motor means comprises an electric motor driving a speed reduction unit.

7. A cut-off machine according to claim 4 wherein
(G) said motor means comprises a separate electric motor respectively driving each flywheel.

8. A cut-off machine according to claim 7 wherein:
(H) each motor comprises an electric motor driving a respective speed reduction unit.

9. A cut-off machine according to claim 2 wherein:
(E) each power shaft comprises a crankshaft and each drive member comprises a crank portion of said crankshaft journalled in bearing means carried by said ram.

10. A cut-off machine comprising:
(A) a frame defining a work station;
(B) a ram mounted on said frame for movement through a power stroke to perform a cut-off operation on a workpiece positioned at said work station;
(C) motor means on said frame;
(D) means directing power from said motor means along two separate power trains, said two separate power trains extending between said motor means and spaced points on said ram; and
(E) synchronizing means separate from said power directing means extending between said power trains and operative to synchronize said power trains so as to synchronize the movement of said ram through said power stroke.

11. A cut-off machine according to claim 10 wherein:
(F) each power train includes a flywheel driven by said motor means, a power shaft extending between the respective flywheel and the ram, and a clutch interconnecting a respective flywheel and a respective power shaft.

12. A cut-off machine according to claim 11 wherein:

(G) each power shaft comprises a crankshaft; and
(H) each crankshaft includes a crank portion journalled in said ram.

13. A cut-off machine according to claim 12 wherein:
(I) said synchronizing means comprises a gear train including gears respectively mounted on said crankshaft and at least one idler gear.

14. A cut-off machine according to claim 13
(J) said motor means comprises a single motor means driving both of said flywheels.

15. A cut-off machine according to claim 13 wherein:
(J) said motor means comprises a separate motor respectively driving each of said flywheels.

16. A cut-off machine according to claim 14 wherein:
(K) said single motor means comprises an electric motor driving a speed reduction unit.

17. A cut-off machine according to claim 15 wherein:
(K) each of said motors comprises an electric motor driving a respective speed reduction unit.

18. A cut-off machine according to claim 10 wherein each power train comprises:
a flywheel driven by said motor means;
a power shaft journalled in said frame;
a clutch interconnecting said flywheel with said power shaft;
first gear means mounted to said power shaft;
a drive member mounted on said frame engaging said ram; and
second gear means mounted to said drive member engaging said first gear means wherein power is transferred along said power train from said motor means to said ram.

19. A cut-off machine according to claim 18 wherein said synchronizing means comprises a gear train interconnecting said power trains.

20. A cut-off machine according to claim 19 wherein the gear said gear train comprises:
an idler shaft mounted journalled in said frame; and
an idler gear, mounted to said idler shaft, engaging said first and second gear means.

21. A cut-off machine according to claim 20 wherein said motor means comprises a single motor driving a plurality of flywheels.

22. A !cut-off machine according to claim 21 wherein said motor means comprises a single and separate motor driving each individual flywheel.

* * * * *